(12) United States Patent
Koch et al.

(10) Patent No.: US 9,397,534 B2
(45) Date of Patent: Jul. 19, 2016

(54) DEVICE FOR DAMPING VIBRATIONS WITH AN ENERGY RECOVERY CAPABILITY, AND VEHICLE WITH SUCH A DEVICE

(71) Applicant: Audi AG, Ingolstadt (DE)

(72) Inventors: Tilo Koch, Ingolstadt (DE); Andreas Unger, Nürnberg (DE); Bastian Scheurich, Bad Wimpfen (DE); Frank Gauterin, Leinsweiler (DE)

(73) Assignees: AUDI AG, Ingolstadt (DE); KARLSRUHER INSTITUT FÜR TECHNOLOGIE, Karlsruhe (DE)

( * ) Notice: Subject to any disclaimer, the term of this patent is extended or adjusted under 35 U.S.C. 154(b) by 0 days.

(21) Appl. No.: 14/761,560

(22) PCT Filed: Dec. 20, 2013

(86) PCT No.: PCT/EP2013/003879
§ 371 (c)(1),
(2) Date: Jul. 16, 2015

(87) PCT Pub. No.: WO2014/111119
PCT Pub. Date: Jul. 24, 2014

(65) Prior Publication Data
US 2015/0364974 A1 Dec. 17, 2015

(30) Foreign Application Priority Data
Jan. 17, 2013 (DE) .......................... 10 2013 000 798

(51) Int. Cl.
*F03G 7/08* (2006.01)
*H02K 7/18* (2006.01)
(52) U.S. Cl.
CPC ................ *H02K 7/1892* (2013.01); *F03G 7/08* (2013.01)

(58) Field of Classification Search
USPC .......................................................... 290/1 R
See application file for complete search history.

(56) References Cited

U.S. PATENT DOCUMENTS

| 2004/0119289 A1 | 6/2004 | Zabramny |
| 2012/0146339 A1 | 6/2012 | Lee |

(Continued)

FOREIGN PATENT DOCUMENTS

| CA | 2 503 607 | 10/2006 |
| CN | 104864014 A * | 8/2015 |

(Continued)

OTHER PUBLICATIONS

CN204827827 computer translation.*

(Continued)

*Primary Examiner* — Joseph Waks
(74) *Attorney, Agent, or Firm* — Henry M. Feiereisen LLC

(57) ABSTRACT

A device for damping vibrations with an energy recovery capability includes an input shaft rotatable about the input shaft longitudinal axis with an alternating rotational direction by a component that vibrates relative to the device. A freewheel device is connected to the input shaft on the drive side and at least indirectly to a generator on the output side, the generator being capable of converting the kinetic rotational energy into electric energy and transferring said energy to an energy storage element, and the freewheel device includes a first and a second freewheel, each being rotationally fixed to the input shaft on the drive side and arranged so as to lock in opposite directions of rotation. The second freewheel is connected to a reversing gear mechanism on the output side, and the reversing mechanism and the first freewheel are at least indirectly connected to the generator on the output side.

11 Claims, 1 Drawing Sheet

(56) References Cited

U.S. PATENT DOCUMENTS

| | | | |
|---|---|---|---|
| 2013/0049508 A1 | 2/2013 | Willems | |
| 2013/0131920 A1 | 5/2013 | Meitinger et al. | |
| 2013/0140882 A1* | 6/2013 | Agnew | H02J 7/00 307/9.1 |
| 2013/0154277 A1 | 6/2013 | Willems | |
| 2013/0320791 A1 | 12/2013 | Willems | |
| 2014/0195115 A1 | 7/2014 | Müller et al. | |
| 2015/0330372 A1* | 11/2015 | Nulman | F03G 7/08 290/1 R |

FOREIGN PATENT DOCUMENTS

| | | |
|---|---|---|
| CN | 204827827 U * | 12/2015 |
| DE | 298 14 582 | 12/1998 |
| DE | 102008030578 | 12/2009 |
| DE | 102009048818 | 4/2011 |
| DE | 102010015313 | 10/2011 |
| DE | 102010035088 | 3/2012 |
| DE | 102011054854 | 6/2012 |
| DE | 102011009608 | 8/2012 |
| JP | 2001-055033 | 2/2001 |
| WO | WO 2009/092588 | 7/2009 |

OTHER PUBLICATIONS

International Search Report issued by the European Patent Office in International Application PCT/EP2013/003879 on Jan. 24, 2014.

* cited by examiner

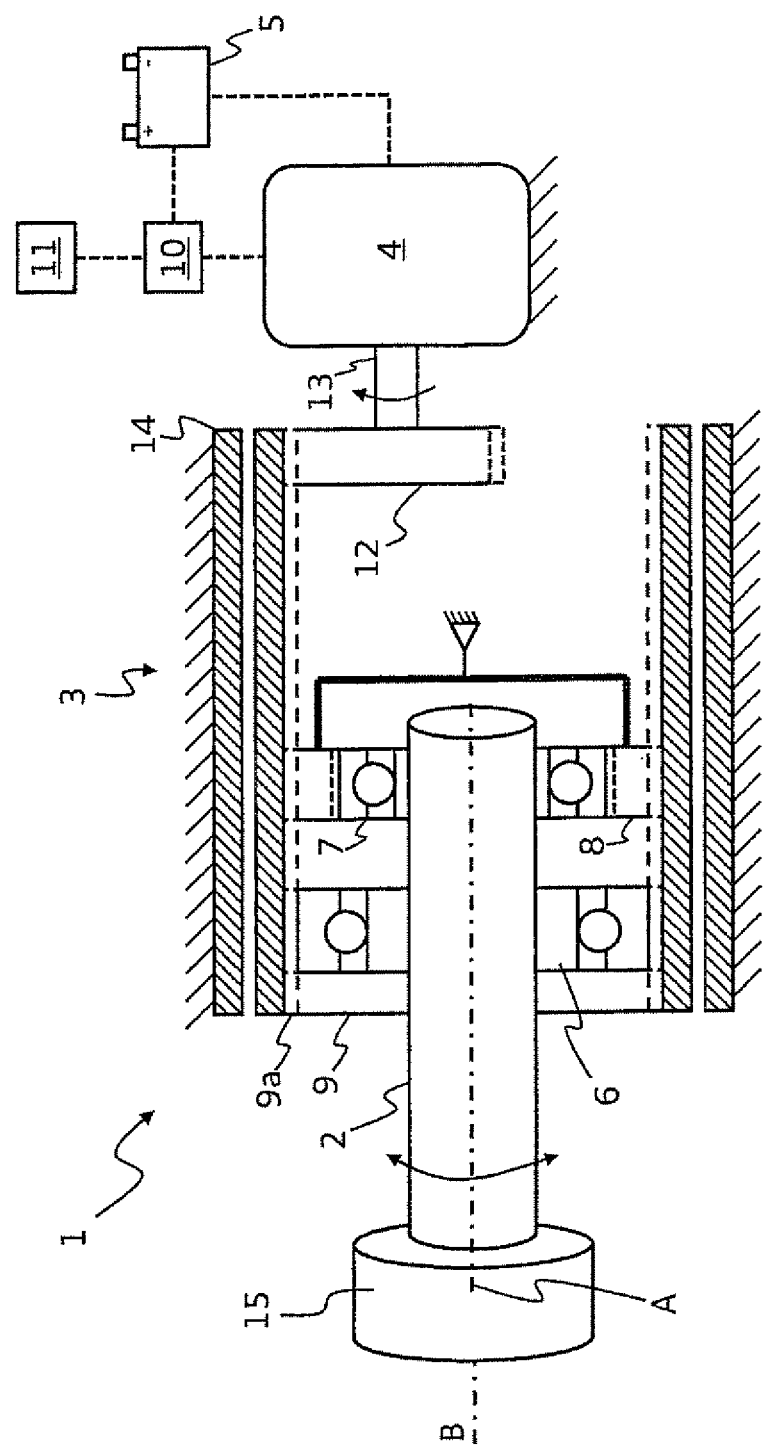

DEVICE FOR DAMPING VIBRATIONS WITH AN ENERGY RECOVERY CAPABILITY, AND VEHICLE WITH SUCH A DEVICE

CROSS-REFERENCES TO RELATED APPLICATIONS

This application is the U.S. National Stage of International Application No. PCT/EP2013/003879, filed Dec. 20, 2013, which designated the United States and has been published as International Publication No. WO 2014/111119 and which claims the priority of German Patent Application, Serial No. 10 2013 000 798.4, filed Jan. 17, 2013, pursuant to 35 U.S.C. 119(a)-(d).

BACKGROUND OF THE INVENTION

The present invention relates to a device for damping vibrations with an energy recovery capability including an input shaft which can be rotated about the input shaft's longitudinal axis with an alternating rotational direction by a component that vibrates relative to the device, wherein on the input side a freewheel device is connected to the input shaft and on the output side at least indirectly to a generator, which generator is capable of converting the kinetic rotational energy into electric energy and transferring the electric energy to an energy storage element, and a vehicle with such a device.

In vehicle construction such devices for damping vibrations are for example installed parallel to spring devices to avoid rocking and vibrating of the vehicle superstructure in response to corresponding excitation resulting from road irregularities or certain driving situations and to quickly dampen vibrations of a wheel or axle induced by the road surface. Devices for damping vibrations (colloquially referred to as "dampers") available on the market to date, absorb the energy of the road impulses, thereby heating up. Thus with the goal of improving overall energy efficiency in view, devices for damping vibrations with energy recovery capability have recently become the focus of development.

The generic DE 10 2011 054 854 A1 discloses an energy recovery device for a suspension system of a vehicle, including a suspension connecting arm, which connects a wheel carrier with a lower frame to enable the wheel carrier to move upwards or downwards depending on road conditions, a rotational direction converter which is arranged between a vehicle body side connecting section of the suspension connecting arm and a vehicle body, and which converts a two-directional movement of the body side connecting section corresponding to the up- and downwards movement of the suspension connecting arm to a one-directional movement, a generator which is rotated by means of a torque outputted by the rotational direction converter to generate electrical energy, a rectifier which is connected to the generator to rectify the generated electrical energy, and a battery which is connected to the rectifier in order to charge the battery with the electrical energy. The rotational direction converter is preferably designed as one-way clutch, wherein the one-way clutch is arranged such as to actuate the generator either when the connecting suspension arm is moved downwards or upwards.

Disadvantageously, as a result of using the one-way clutch, the described energy recovery device only transmits one of the two movement directions to the generator (either the upwards or the downwards movement), while the other movement direction is freewheeling. Consequently, approximately only half of the kinetic potential is used for energy recovery.

SUMMARY OF THE INVENTION

Object of the present invention is to provide a vibration damping device with energy recovery and a vehicle with such a device for damping vibrations, which achieves a considerably higher energy recovery rate compared to the state of the art.

The object is achieved by a device for damping vibrations with energy recovery, including: an input shaft, having a longitudinal axis and being rotatable about the longitudinal axis in alternating rotational directions by a component that vibrates relative to the device; a freewheel device having an input side and an output side and being connected on the input side to the input shaft, said freewheel device comprising a first freewheel and a second freewheel arranged on the output side, said first and second freewheels each being rotationally fixed to the input shaft and configured to lock in opposite directions of rotation of the input shaft; and a generator, capable of converting the kinetic rotational energy into electric energy and transferring said electric energy to an energy storage element, said second freewheel being connected on the output side to a reversing gear mechanism, said reversing gear mechanism and said first freewheel being at least indirectly connected to the generator on the output side.

A vehicle including a device according to the invention for damping vibrations with energy recovery is also disclosed.

A device for damping vibrations with energy recovery includes an input shaft, which can be rotated about the input shaft's longitudinal axis with an alternating rotational direction by a component that vibrates relative to the device, wherein a freewheel device is connected on the input side to the input shaft and on the output side at least indirectly to a generator, which is capable of converting the kinetic rotational energy into electric energy and to transmit the energy to an energy storage element, wherein the freewheel device includes a first and a second freewheel, wich on the input side are both fixed to the input shaft in rotative fixed relationship with the input shaft and arranged so as to lock in the opposite direction, wherein the second freewheel is connected on the output side to a reversing gear mechanism, and in particular meshes with the reversing gear mechanism, and wherein the reversing gear mechanism and the first freewheel are at least indirectly connected to the generator on the output side.

By arranging two freewheels with opposite locking direction on the input shaft, the force flux is alternately transmitted either in case of a right hand rotation or left hand rotation of the shaft. Arranging a reversing gear downstream of one of the two freewheels (described here as second freewheel), results in a rectified rotational movement at the common output of the reversing gear mechanism and the other freewheel (described here as first freewheel) during left hand- and right hand rotation of the input shaft. The common output of the freewheel device is at least indirectly connected to a rotor shaft of the generator which recuperates kinetic energy. In contrast to the aforementioned state of the art, the energy efficiency is considerably increased in that both rotational directions of the input shaft can be transmitted to the rotor shaft of the generator by the freewheel device. The generator thereby rotates with an increased angular speed. Furthermore, mass inertia effects, which would be caused during a change of directions of the rotor shaft of the generator are temporally decoupled.

Due to its functional principle, the generator can only transmit a force flux via the freewheels in the direction of the input shaft, when the angular speed of the generator is slower than that of the input shaft. A generator rotating with high angular speed would therefore mean that the input shaft, when rotating with slower angular speed, cannot establish a torque coupling with the generator and correspondingly rotates freely. In this case, a very low damping would be established by the device, which would, for instance, correspond to the comfort mode of a vehicle. If on the other hand a torque coupling between the generator and the input shaft is desired, the generator would have to be slowed down below the momentary angular speed of the input shaft, which can be realized by an appropriate control algorithm. For this purpose, a sensor technology can be used with which the angular speed is monitored and provided to the control device of the generator for controlling the generator.

In a preferred embodiment of the device the freewheels and the reversing gear mechanism are arranged within a hollow shaft, which is at least indirectly connected to the rotor shaft of the generator, wherein the first freewheel and the reversing gear mechanism mesh with the hollow shaft. The hollow shaft preferably has an internal toothing, with which the externally toothed components reversing gear mechanism and first freewheel mesh. By integrating the freewheels and the reversing gear mechanism into the hollow shaft, a very compact construction is thus realized. The hollow shaft is preferably arranged within a housing for rotation with low friction. For further integration, also the generator with its control device could be arranged within the housing and possibly also within the hollow shaft.

In a preferred embodiment of the device, the degree of energy conversion of the generator is continuously adjustable by a control device. This enables adjusting the damping characteristics continuously over a wide range, which opens up new possibilities for an adaptive vibration damping.

In a preferred embodiment of the device, the energy storage element can be configured as a battery or capacitor. The battery can store the generator's electrical energy as chemical energy over a comparatively long period of time and, if appropriate can feed it into a connected network. The same can be achieved by a capacitor, for example as so-called "supercaps" which, however, is only capable of temporarily storing the energy for a relatively short period of time. However, due to its fast charging- and discharging cycles, the capacitor can be used as buffer storage.

In a preferred embodiment of the device, a reduction gear is located upstream of the generator, which increases the output-side angular speed of the freewheel device for the generator. The reduction gear is arranged between the freewheel device and the generator to increase the angular speed of the rotor shaft so that the generator can be driven with enhanced efficiency.

A vehicle has at least one device for damping vibrations with energy recovery according to the invention, wherein such a device is preferably assigned to each wheel of the vehicle. In a preferred embodiment, the input shaft is directly or indirectly connected to a wheel guide element. The wheel guide element guides the wheel on one side, and on the other side is attached to the vehicle body or the auxiliary frame. The up- and down-movement of the wheel is a pivoting movement at the pivot point on the vehicle body, so that in a preferred embodiment of the vehicle the longitudinal axis advantageously extends coaxially to a pivot axis of the wheel guide element.

In a preferred embodiment of the vehicle, the wheel guide element is designed as a control arm, particularly a transverse control arm.

In a preferred embodiment of the vehicle, the freewheel device is arranged on a vehicle body or an auxiliary frame. The freewheel device is therefore securely fastened to the sprung mass of the vehicle and is subjected to the vibrations of the unsprung mass via the alternately rotating input shaft, as for example when driving over uneven road irregularities.

In a preferred embodiment of the vehicle, the degree of energy conversion by the generator is continuously adjustable by a control device, wherein the control device can be influenced by a driving stability control device. The continuous adjustment of the generator's recuperation performance allows a very flexible adjustment of the damping. When data of a driving stability control device, for example an electronic stability program (ESP), are utilized in this regulation, the driving behavior of the vehicle can be positively influenced by a corresponding continuous adjustment of the damping characteristic.

BRIEF DESCRIPTION OF THE DRAWING

Further details and advantages of the invention will become apparent from the following description of a preferred embodiment with reference to the drawing.

Therein, the sole FIGURE shows a schematic view of the device for damping vibrations.

DETAILED DESCRIPTION OF PREFERRED EMBODIMENTS

According to the FIGURE, a device 1 for damping vibrations with energy recovery includes an input shaft 2, whose longitudinal axis A is arranged coaxially to a pivot axis B of a wheel guide element 15 of a not shown vehicle and is connected to the wheel guide element 15 in a rotationally fixed manner. During vehicle operation the input shaft 2 carries out irregular rotary motions about the rotation axis A with alternating directions of rotation. A freewheel device 3 is coupled to the input shaft 2. The freewheel device 3 includes a first freewheel 6 and a second freewheel 7 which are both arranged one behind the other on the input shaft 2 to lock in opposite directions and are connected to the input shaft in rotative fixed relationship with the input shaft. In the present case, the first freewheel 6 meshes on the output side with an internal toothing 9a of a hollow shaft 9, which, inter alia, encloses the freewheels 6 and 7. The hollow shaft 9 is rotatably supported in a housing which is fixed to the vehicle body. The second freewheel 7 meshes on the output side with a reversing gear mechanism 8, which in turn meshes with the internal toothing 9a of the hollow shaft 9. The hollow shaft 9 is operatively connected with a reduction gear 12 on the output side, wherein the reduction gear 12 increases the angular speed of the hollow shaft 9 for a rotor shaft 13 of an electric generator 4 that is connected to the output of the reduction gear 12. The generator 4 converts the kinetic energy from the rotation of the rotor shaft 13 into electric energy and transmits the electric energy to an energy storage element 5. A control device 10 monitors and controls the operation of the generator 4 and the energy storage element 5, particularly the recuperation performance of the generator 4 and energy intake capability of the energy storage element 5 are monitored. The recuperation performance also determines the damping ratio of the device 1, which is why the control device 10 furthermore exchanges data with a driving stability control device 11 for selecting an appropriate control strategy.

What is claimed is:

1. A device for damping vibrations with energy recovery, comprising:
    an input shaft, having a longitudinal axis and being rotatable about the longitudinal axis in alternating rotational directions by a component that vibrates relative to the device;
    a freewheel device having an input side and an output side and being connected on the input side to the input shaft, said freewheel device comprising a first freewheel and a second freewheel arranged on the output side, said first and second freewheels each being rotationally fixed to the input shaft and configured to lock in opposite directions of rotation of the input shaft; and
    a generator, capable of converting the kinetic rotational energy into electric energy and transferring said electric energy to an energy storage element, said second freewheel being connected on the output side to a reversing gear mechanism, said reversing gear mechanism and said first freewheel being at least indirectly connected to the generator on the output side.

2. The device of claim 1, further comprising a hollow shaft at least indirectly connected to a rotor shaft of the generator, wherein the first and second freewheels and the reversing gear mechanism are arranged within the hollow shaft, and wherein the first freewheel and the reversing gear mechanism mesh with the hollow shaft.

3. The device of claim 1, further comprising a control device, constructed to enable a continuous adjustment of a degree of energy conversion of the generator.

4. The device of claim 1, wherein the energy storage element is configured as battery or a capacitor.

5. The device of claim 1, further comprising a reduction gear arranged upstream of the generator, said reduction gear increasing an angular speed of the freewheel device for the generator on the output side.

6. A vehicle comprising at least one device for damping vibrations with energy recovery according to claim 1.

7. The Vehicle of claim 6, further comprising a wheel guide element, said input shaft being connected directly or indirectly to the wheel guide element.

8. The vehicle of claim 7, wherein the longitudinal axis of the input shaft is arranged coaxially to a pivot axis of the wheel guide element.

9. The vehicle of claim 7, wherein the wheel guide element is constructed as a control arm.

10. The vehicle of claim 6, wherein the freewheel device is arranged on a body of the vehicle or an auxiliary frame of the vehicle.

11. The vehicle of claim 6, further comprising a control device and a driving stability control apparatus, said control device enabling continuous adjustment of a degree of energy conversion of the generator, and being controllable by the driving stability control device.

* * * * *